United States Patent
Jacobson et al.

(10) Patent No.: US 8,547,851 B1
(45) Date of Patent: *Oct. 1, 2013

(54) SYSTEM AND METHOD FOR REPORTING TRAFFIC INFORMATION FOR A NETWORK

(75) Inventors: Van Jacobson, Woodside, CA (US); Haobo Yu, Sunnyvale, CA (US)

(73) Assignee: Packet Design, LLC, Santa Clara, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 12/798,157

(22) Filed: Mar. 29, 2010

Related U.S. Application Data

(63) Continuation of application No. 11/906,424, filed on Oct. 1, 2007, now Pat. No. 7,688,740, which is a continuation of application No. 10/374,882, filed on Feb. 26, 2003, now Pat. No. 7,277,393.

(60) Provisional application No. 60/364,895, filed on Mar. 13, 2002, provisional application No. 60/384,590, filed on May 30, 2002, provisional application No. 60/380,077, filed on May 6, 2002.

(51) Int. Cl.
*H04L 12/56* (2006.01)

(52) U.S. Cl.
USPC .......................................................... 370/238

(58) Field of Classification Search
USPC ................. 370/229–230, 235, 237, 238, 389, 370/395.1–395.43, 400
See application file for complete search history.

(56) References Cited

U.S. PATENT DOCUMENTS 7,002,960 B1 * 2/2006 Golan et al. .................. 370/393

* cited by examiner

*Primary Examiner* — Frank Duong
(74) *Attorney, Agent, or Firm* — Innovation Partners; Charles E. Gotlieb

(57) ABSTRACT

A system and method identifies the costs to be assigned to each link in a network that can more evenly balance the utilization of links in the network.

14 Claims, 5 Drawing Sheets

SYSTEM AND METHOD FOR REPORTING TRAFFIC INFORMATION FOR A NETWORK

CROSS REFERENCE TO RELATED APPLICATIONS

This application is a continuation of application Ser. No. 11/906,424, filed on Oct. 1, 2007, now U.S. Pat. No. 7,688,740 entitled, "System and Method for Identifying Cost Metrics for a Network" by Van Jacobson and Haobo Yu which is a continuation of application Ser. No. 10/374,882, filed on Feb. 26, 2003, Entitled "System and Method for Identifying Cost Metrics for a Network" issued as U.S. Pat. No. 7,277,393 on Oct. 2, 2007, which claims the benefit of U.S. Provisional Patent Application Ser. No. 60/364,895 entitled, "Method and apparatus for Identifying Cost Metrics for a Network" filed on Mar. 13, 2002 by Van Jacobson and Haobo Yu, U.S. Provisional Patent Application Ser. No. 60/384,590 entitled, "Method and Apparatus for Emulating Circuits and Provisioning Emulated Circuits on a Packet Switched Network" filed on May 30, 2002, by Kathleeen Nichols, Van Jacobson, Haobo Yu and Kedar Poduri, U.S. Provisional Patent Application Ser. No. 60/380,077 entitled, "Method and Apparatus for Providing Information About a Distance Vector Protocol Network" filed on May 6, 2002 by Van Jacobson and Cengiz Alaettinoglu, each of which has the same assignee as the present invention and each of which is incorporated herein by reference in its entirety.

FIELD OF THE INVENTION

The present invention is related to computer software and more specifically to networking computer software.

BACKGROUND OF THE INVENTION

Packet switched networks are made of routers and links between the routers. Each router receives a packet, determines the least cost available path to the destination, and places the packet on a link in that shortest path. The costs of links in the network are traditionally assigned with a value inversely proportional to the bandwidth of the link. This causes high bandwidth links to be used more often than low bandwidth links in order to balance the utilization of the links.

While this method of assigning traffic using costs inversely proportional to the bandwidth can work well when traffic is uniformly distributed over the network, it works less well when traffic is concentrated among a subset of source and destination pairs. What is needed is a system and method that can assign costs to links in a packet switched network to balance utilization over links in the network even when traffic is not uniformly distributed.

SUMMARY OF INVENTION

A system and method simulates traffic under varying costs associated with each link to identify the costs that optimize the utilization of the network.

DETAILED DESCRIPTION OF A PREFERRED EMBODIMENT

Figure 1:
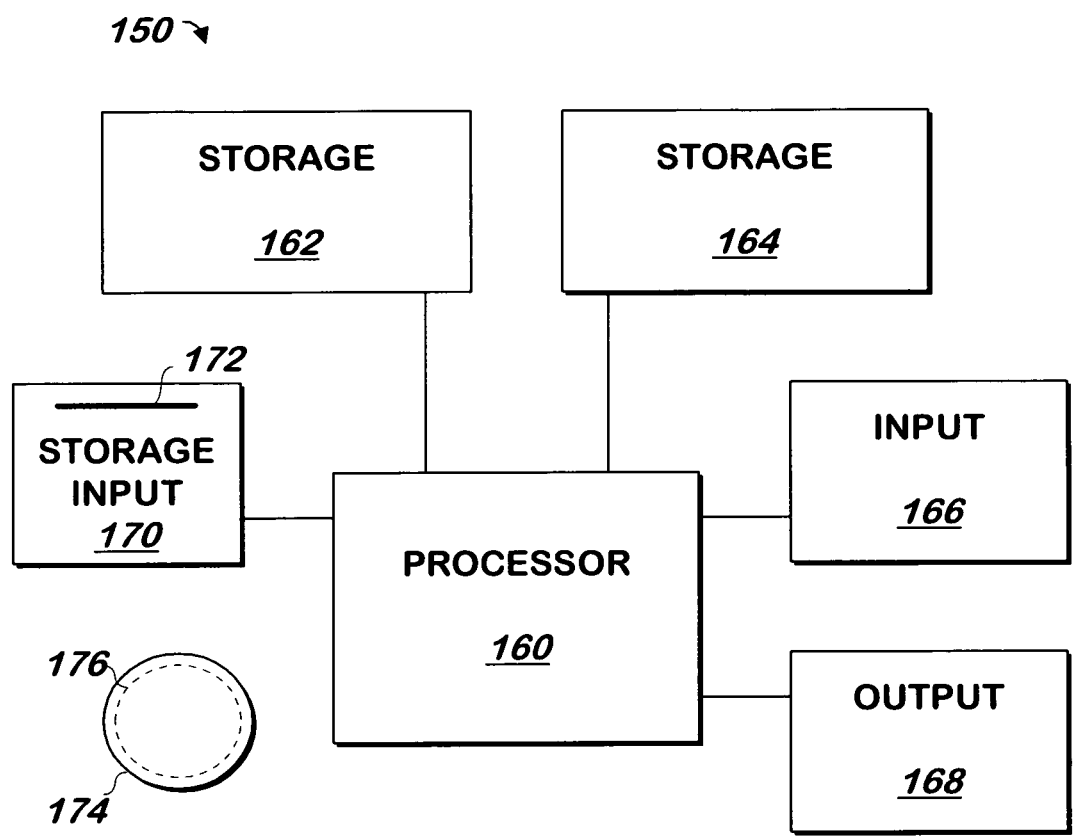
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running a version of the Windows operating system (such as 95, 98, Me, XP, NT or 2000) commercially available from Microsoft Corporation of Redmond Wash. or running the FreeBSD operating system commercially available from the website freebsd.org, or a Macintosh computer system running the MacOS or OpenStep operating system commercially available from Apple Computer Corporation of Cupertino, Calif. and the Netscape browser commercially available from Netscape Computer Corporation of Mountain View, Calif. although other systems may be used.

Figure 2:
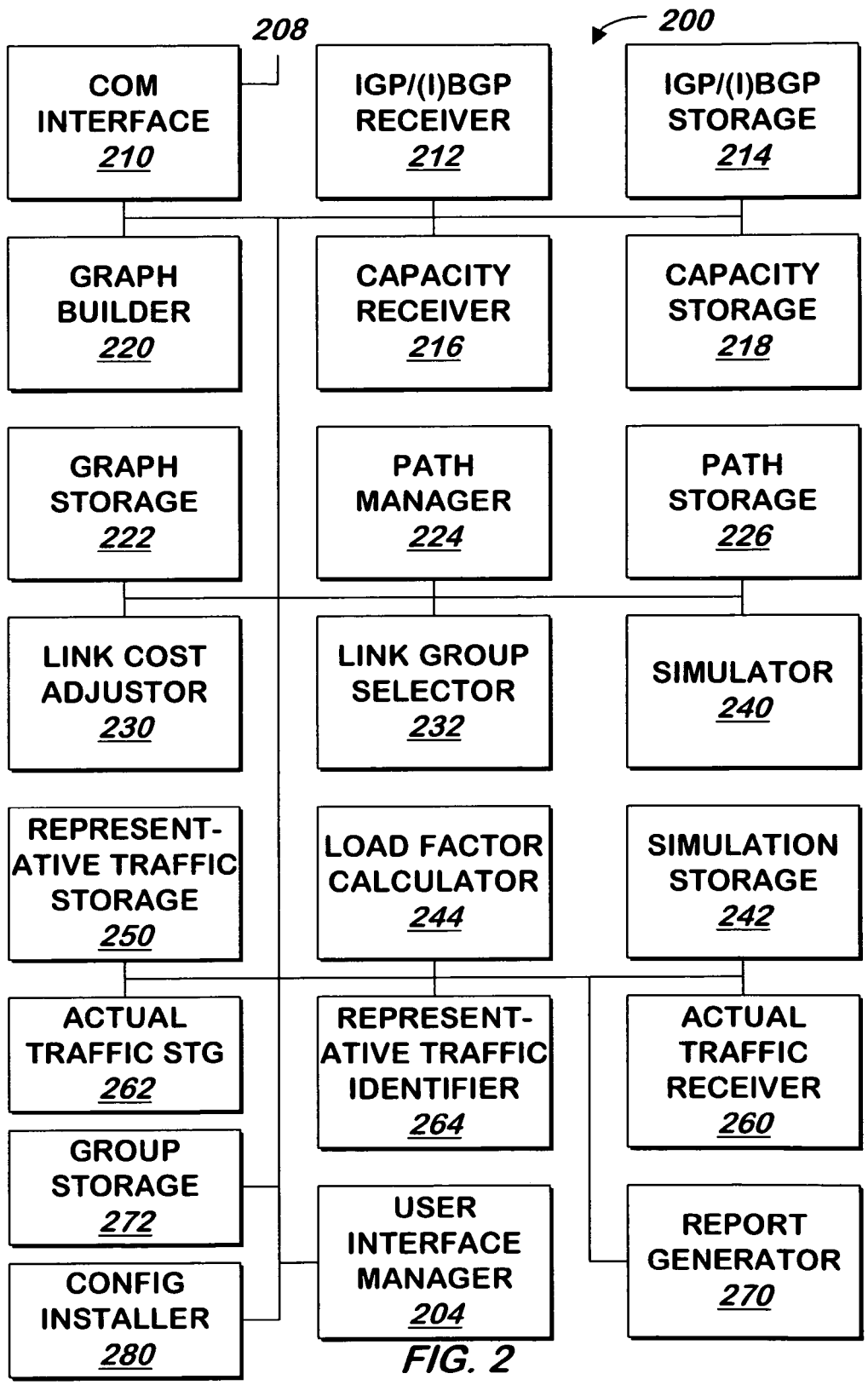
FIG. 2 is a block schematic diagram of a system for identifying link costs to more evenly distribute traffic through a network under consideration according to one embodiment of the present invention.

Referring now to FIG. 2, a system 200 for identifying link costs to more evenly distribute traffic through a network under consideration is shown according to one embodiment of the present invention. The network under consideration may be an autonomous system ("AS"), which is a network under administrative control of a single entity. For example, a conventional Internet service provider ("ISP") may be made of one or more autonomous systems. The description below describes the network under consideration as a single AS, although the present invention applies to any type of network, including a network made of a part of, or a whole AS, or multiple autonomous systems.

In one embodiment, all communication into or out of system 200 is made via input/output 208 of communication interface 210 which is coupled to a network such as the Internet or a local area network or both. Communication interface 210 is a conventional communication interface that supports TCP/IP or other conventional communication protocols.

Gather Topology and Build Model

To use the system, a user interacts with a user interface provided by user interface manager 206. The user begins by sending a request to user interface manager 206 to gather the topology of the AS and obtain actual traffic from the AS. When such a request is received, user interface manager 206 signals IGP/(I)BGP receiver 212, capacity receiver 216, graph builder 220 and actual traffic receiver 260.

IGP/(I)BGP receiver 212 and capacity receiver 216 gather information about the topology of the AS under consideration from the routers in the AS and optionally other devices such as route reflectors. This information includes identifiers such as IP addresses of each router or other node in the AS, information about direct links from each node to other nodes, and the capacity of each such link. The information also includes, for each border router, the sets of addresses to which communications may be sent using that border router, and the costs, or other characteristics associated with such communication. This information is stored in IGP/(I)BGP storage 214, in a manner that will now be described. The description below illustrates one way of gathering topology information about a network although any other technique of gathering information about a network, such as retrieving prestored topology information from a database, may be used.

IGP/(I)BGP receiver 212 obtains and stores the IP addresses of each node in the AS and information about direct links between such nodes. Information such as address mask pairs of internal networks to which a node corresponds is also obtained by IGP/(I)BGP receiver 212. An internal network is a computer or network that is not part of the AS, such as computers or networks operated by customers of the entity that operates the AS. As described herein, a node includes any physical or logical device or group of devices under administrative control of the entity whose network is under consideration, where the device or group of devices has an identifier such as an IP address. Nodes include physical routers, logical routers, and internal networks. To obtain this information, IGP/(I)BGP receiver 212 participates in a series of communications with routers of the AS using a conventional IGP protocol such as RIP-2, OSPF, or IS-IS.

IGP/(I)BGP receiver 212 also obtains the IP address of each border router in the AS and the sets of external addresses (designated by prefix/mask pairs) for which the border router may be used to forward communications, and the costs associated with doing so. To obtain this information, IGP/(I)BGP receiver 212 receives communications from border routers using the conventional (I)BGP protocol.

IGP protocols and the (I)BGP protocol are described on the website of the Internet Engineering Task Force, ietf.org, which is hereby incorporated by reference herein in its entirety. RIP-2 is described in RFC 1723, OSPF is described in RFC 1583, IS-IS is described in RFCs 1142 and 1195, and BGP is described in RFCs 1267, 1268, 1771 and in IETF draft draft-ietf-idr-bgp4-17.txt.

As part of the communications described above, IGP/(I)BGP receiver 212 receives lists of links that the nodes have available to other nodes, the costs (i.e. routing metrics used in identifying routes) associated with each of those links, and the other nodes corresponding to routers and networks that can be reached by those links. IGP/(I)BGP receiver 212 stores this information in IGP/(I)BGP storage 214.

Capacity receiver 216 participates in a series of communications with routers of the AS using the TE extensions to the IGP protocols described above or using the Telnet protocol to retrieve information using SNMP. As part of these communications, capacity receiver 216 receives the bandwidth of each link of each router. For each link for which capacity receiver 216 receives information, capacity receiver 216 stores the link identifier and the capacity of the link in capacity storage 218. The link identifier may be the IP address of each of the node interfaces between which the link exists.

Following a period that is at least as long as the expected amount of time it takes to obtain a complete description of the AS in IGP/(I)BGP storage 214, graph builder 220 reads path and capacity information from IGP/(I)BGP storage 214 and capacity storage 218 and constructs a model of the AS and its internal networks in the following manner. For each node of the AS, graph builder 220 selects the node in IGP/(I)BGP storage 214, and creates an entry for the selected node in graph storage 222. Within each such entry, graph builder 220 places an identifier such as the IP address of the selected node, and a list of items, each item corresponding to the other nodes directly (that is, in one hop, without passing through another node in the network) reachable from the selected node. For each item in the list, graph builder 220 places an identifier such as IP address of a different direct node, which is a node within the AS that can be reached directly by the selected node, from IGP/(I)BGP storage 214. If the selected node is a border router, graph builder 220 places a set of IP addresses and masks indicating a range of external addresses reachable from the selected node, also from IGP/(I)BGP storage 214, in the list item. If the selected node is not a border router, graph builder places in the list item any set of IP addresses of internal networks (e.g. via one or more address/mask pairs) reachable from that router without passing through another physical router, also from IGP/(I)BGP storage 214.

After graph builder 220 places the identifier of the direct node into a list item, graph builder 220 extracts the cost of the link from the selected node to the direct node from IGP/(I)BGP storage 214, and places this cost into the list item corresponding to the direct node to which the link exists. Graph builder 220 scans capacity storage 218 to locate an entry for the link between the selected node and the direct node, extracts the link capacity from the entry in capacity storage 218, and places the link capacity into the list item of the selected node and associated with the corresponding direct node in graph storage 222. When graph builder 220 has completed building the model of the AS described above, graph builder 220 signals user interface manager 206.

In one embodiment, as graph builder 220 constructs the list of items, graph builder 220 compares the IP address it would use to add a new item to the IP addresses of the other items in the entry for the selected node. If graph builder 220 detects a match, then the new item would represent a parallel link from the selected node to another node indicated by the IP address matched. In such embodiment, when graph builder 220 detects such parallel links, graph builder 220 logically merges the parallel links into the existing matching item in the selected entry to represent all such parallel links instead of adding a new item for each parallel link. To merge an additional link into an item, graph builder 220 adds the bandwidth of the additional link to the bandwidth in the item, and compares the cost of the additional link to the cost stored in the item. If the cost is lower, graph builder replaces the cost in the item with the cost of the additional link. Thus, after the graph is fully constructed, each item for which parallel links exist will contain the sum of the bandwidths for all such parallel links and the minimum cost of all such parallel links.

Obtaining Actual Traffic

Actual traffic receiver 260 uses conventional techniques to receive some or all of the packet traffic in the AS. For each packet received, actual traffic receiver 260 stores the packet header, the number of bytes in the packet (the "traffic bytes"), the IP address of the ingress router, and a timestamp which actual traffic receiver 260 requests and receives from the operating system, into an entry in actual traffic storage 262.

To receive some or all traffic of the AS, in one embodiment, actual traffic receiver 260 connects to conventional port monitors or port mirrors, such as SPAN ports, from one or more routers in the AS, such as all ingress routers in the AS. In another embodiment, actual traffic receiver 260 connects to conventional traffic sampling hardware in a conventional router. In still other embodiments actual traffic receiver 260 is connected to other types of IP traffic sampling equipment.

In one embodiment, actual traffic receiver 260 stores a time offset in each entry in actual traffic storage 262 instead of a timestamp. In such embodiment, actual traffic receiver 260 computes the time offset in the following manner: every time actual traffic receiver 260 receives a packet, actual traffic receiver 260 requests and receives a timestamp consisting of the current date and time from the operating system. Actual traffic receiver 260 computes the time offset by subtracting from this timestamp another timestamp that it requested and received from operating system when the first such packet was received from the same router. Thus the first packet received from any router will have a time offset of zero, and each subsequent packet will have a time offset greater than the one before.

In such embodiment, the time of day that a packet arrives is ignored for purposes of identifying link costs. Each packet is timestamped with a time offset instead of a timestamp to allow the process of retrieval and timestamping of packets to be performed on multiple routers sequentially by router (e.g. retrieval is performed on router A for one hour, then from router B for one hour). As described below, the packets from different routers that have the same offset may then be treated as having arrived simultaneously, even if they in fact arrived at different times. For example, a packet received from router A at 1:15:00 is treated below as having been received simultaneously with a packet received from router B at 2:15:00, if packets were received from router A starting at 1:00:00 and packets were received from router B at 2:00:00. If only one router is used for the simulation, or packets from multiple routers may be received simultaneously, or the user wishes to consider the time of day when analyzing a network, a conventional timestamp may be used instead of an offset.

In one embodiment, actual traffic receiver 260 receives every packet available on the port monitor. In another embodiment, actual traffic receiver 260 receives some fraction of the packets available on the port monitor, such as one fifth, although other embodiments receive other fractions of packets. In such embodiment, the other packets received from the port monitor are ignored by actual traffic receiver 260.

In one embodiment, actual traffic receiver 260 discards any received packets that contain either or both a source IP address or a destination IP address that is within the AS (as indicated by the graph in graph storage 222), thus preserving only those packets that travel between pairs of border routers. In another embodiment, no such discarding is performed for such intra-AS traffic.

In one embodiment, actual traffic receiver 260 receives packets from any one router for a sampling period, such as twelve hours, then stops receiving packets from that router and receives packets from a different router until traffic has been received from all routers from which traffic is to be received. In another embodiment, actual traffic receiver 260 receives packets for several routers simultaneously, or essentially simultaneously, during the sampling period. "Essentially simultaneously" means starting within a certain threshold, for example ten seconds of a starting time, either on the same day or a different day. In one embodiment the user can control how long actual traffic receiver 260 receives packets, and for which routers, although actual traffic receiver 260 may use default values if no such values are specified.

In one embodiment, the user identifies to user interface manager 206 the amount of time the traffic is to be collected from any given router. User interface manager 206 provides this amount of time to actual traffic receiver 260, which then signals user interface manager 206 when it has collected traffic for that amount of time. User interface manager 206 allows the user to identify another router from which to gather actual traffic, or request a report of cost metrics to use to more evenly distribute traffic over the AS as described below. In another embodiment, the addresses and collection periods may be provided to user interface manager 206 for multiple routers, and user interface manager 206 automatically provides the IP address and collection period to actual traffic receiver 260 one router at a time until collection of actual traffic from all such routers has occurred, at which point user interface manager 206 initiates the generation of the report described herein. In one embodiment, a user may specify to user interface manager 206 that actual traffic is to be collected from all routers that advertise that they may provide traffic to an external network, using an assumption that all egress routers are also ingress routers, and user interface manager retrieves the list of routers it will provide to actual traffic receiver 260 from IGP/(I)BGP storage 214.

To generate the report, user interface manager 206 signals path manager 224. In one embodiment, user interface manager 206 signals path manager 224 by providing the IP addresses of all ingress routers from which actual traffic was received as described above.

Calculate Paths or Routes

When signaled, path manager 224 uses the model of the AS in graph storage 222 to build routing tables in path storage 226, using a conventional route calculation algorithm such as is contained within the routing daemon provided with either the FreeBSD operating system or the Solaris operating system, both described above.

In another embodiment, path manager 224 uses the model of the AS in graph storage 222 and a conventional path calculation algorithm such as the Shortest Path First (SPF) algorithm (also known as the Dijkstra algorithm) or Dynamic Shortest Path First algorithm (described below) to identify the least cost path between each ingress router and one or more ranges of external addresses in IGP/(I)BGP storage 214. A description of Dijkstra's algorithm can be found in "OSPF: Anatomy of an Internet Routing Protocol", by J. Moy, Addison-Wesley, 1998, which is hereby incorporated by reference herein in its entirety. The dynamic SPF algorithm is documented in "Fully Dynamic Algorithms for Maintaining Shortest Path Trees", by Daniele Friogioni, Journal of Algorithms, v. 34, pp. 251-281, 2000, which is hereby incorporated herein in its entirety. Path manager 224 identifies the least cost path between such source and one or more such destinations by providing an ordered series of nodes in the path, beginning with one member of the pair of border routers and ending with the egress router having the least cost path from the ingress router and that can forward packets to the one or more ranges of addresses. Path manager 224 stores the IP addresses of each node in the computed or identified path in the entry for that path in path storage 226, along with the range of external addresses to which packets may be sent over the path at a total cost lower than any other available path in the AS. Path manager 224 also assigns a unique identifier to each path and stores it in the entry in path storage 226. When path manager 224 has identified the path from all ingress routers from which actual traffic was received by actual traffic receiver 260 to every range of addresses received as (I)BGP information by IGP/(I)BGP receiver 212, path manager 224 signals representative traffic identifier 264.

Identify Representative Traffic

Representative traffic identifier 264 uses the sampled traffic data in actual traffic storage 262 and the routing tables or calculated paths in path storage 226 to identify representative traffic for each least cost path between every pair of border routers in the AS using a representative sample of the traffic in actual traffic storage 262.

Although there are many ways of identifying a representative sample of the traffic in actual traffic storage 262, in one embodiment, representative traffic identifier 264 uses the traffic stored in actual traffic storage 262 to identify the ninety-fifth percentile level of traffic during a single interval between each router that served as an ingress point into the AS from an internal network or another AS and every router for which traffic from that ingress point left the AS to an internal network or another AS. Each such pair of routers defines a "Flow", as used herein. To identify the ninety-fifth percentile traffic, representative traffic identifier 264 performs the steps that will now be described.

1. Construct Group Entries

Representative traffic identifier 264 builds a series of group entries in group storage 272 to represent traffic flow over the AS. To build the group entries, representative traffic identifier 264 selects the first entry in actual traffic storage 262 and creates and selects a corresponding group entry in group storage 272. Representative traffic identifier 262 places the IP address of the ingress router, the traffic byte count of the entry (e.g. the bytes in the packet in one embodiment), and the timestamp or time offset from the selected actual traffic storage 262 entry into the selected group entry.

Representative traffic identifier 264 extracts the destination IP address from the packet header, and sends the IP address of the ingress router and the extracted destination IP address to path manager 224, which receives the IP address of the ingress router and the destination IP address and uses the two IP addresses, and either the routing tables in path storage 226 to determine the path to an egress router, or a path calculation algorithm to compute the IP address of the egress router as described above. In one embodiment, representative traffic identifier 264 uses the Dynamic Shortest Path First algorithm as a path calculation algorithm.

Path manager 224 sends the computed or determined egress router IP address to representative traffic identifier 264, which receives the egress router IP address and places it into the selected group entry in group storage 272.

Representative traffic identifier 264 selects the next entry in actual traffic storage 262, creates and selects another group entry in group storage 272, and continues as described above until representative traffic identifier 264 has created one group entry containing the ingress router IP address, the egress router IP address, the traffic byte count, and the timestamp or time offset for every entry in actual traffic storage 262.

2. Group the Entries by Receipt Interval

Once representative traffic identifier 264 has built one group entry for every actual traffic storage 262 entry, representative traffic identifier 264 groups the group entries in group storage 272 by receipt interval in the following manner: representative traffic identifier 264 assigns to a first group all group entries with a timestamp or time offset indicating the packet corresponding to the group entry was received during a first receipt interval, such as between zero and three hundred seconds from the beginning of the sampling period, then assigns to a second group all group entries with a receipt timestamp or time offset during a second receipt interval, such as between three hundred and six hundred seconds from the beginning of the sampling period, and so on in this manner until representative traffic identifier 264 has assigned all group entries to a group such that the traffic assigned to any one group will correspond to the same receipt interval, where all receipt intervals have the same duration, all are consecutive, and no receipt interval overlaps another receipt interval. In one embodiment, traffic is assigned to a group by assigning a unique identifier to the receipt interval, and adding to each entry in group storage 272 the unique identifier of the receipt interval to which the entry was assigned.

Although three hundred seconds was used as an interval in the description above, other embodiments may use other intervals. For example, in another embodiment, representative traffic identifier 264 uses a time interval of 900 seconds.

3. Sum Entries Using the Same Routers During the Same Interval

Once representative traffic identifier 264 has grouped all of the group entries in group storage 272 by receipt interval, representative traffic identifier 264 combines group entries representing packets that used the same ingress and egress routers (i.e. the same Flow) in the same interval. For each group in group storage 272, representative traffic identifier 264 combines all group entries within that group that contain the same ingress router IP address and egress router IP address. To combine two or more group entries, representative traffic identifier 264 sums the traffic bytes counts for each group entry being combined, stores the summed traffic byte count in one of the group entries being combined, and deletes the other group entries being combined. Thus, only one group entry exists in group storage 272 representing all of the traffic in actual traffic storage 262 that was received in the same time interval and was assigned the same ingress and egress routers (e.g. the same Flow).

4. Sort by Ingress/Egress Router and Byte Count

Representative traffic identifier 264 then sorts the entries in group storage 272 by the ingress router IP address and the egress router IP address, treating the two IP addresses as one eight-byte field for the purposes of sorting. Representative traffic identifier 264 sorts group entries with common ingress router and egress router IP addresses by the traffic byte count in descending order, which may have been summed as described above.

5. Select a Representative Entry for Each Path

For each Flow (represented by the ingress IP address/egress IP address pair) in the sorted group entries in group storage 272, representative traffic identifier 264 selects a group entry from group storage 272 as a representative group entry for the Flow by identifying, for each Flow, a group entry that matches a selection criteria, such as the packet having a traffic byte count in the ninety-fifth percentile of all traffic byte counts for that particular path. To identify the ninety-fifth percentile count, for each path, representative traffic identifier 264 multiplies 0.05 times the number of group entries corresponding to that path in group storage 272, rounds this number to the nearest integer in one embodiment, or always rounds up or down in another embodiment, (the rounded number is herein referred to as N) and selects the Nth group entry of the group entries corresponding to that Flow in group storage 272, counting from the group entry with the highest traffic byte count. As representative traffic identifier 264 selects such a group entry for every Flow, representative traffic identifier 264 stores the traffic byte count, the IP address of the ingress router, and the IP address of the egress router from the selected entry into representative traffic storage 250. When representative traffic identifier 254 has selected a representative group entry for each Flow as described above, representative traffic identifier 254 signals simulator 240.

Although the selection criteria was described above as the 95th percentile traffic byte count for a Flow, in one embodiment, the selection criteria is the traffic byte count in the 90th percentile, although other embodiments use other selection criteria.

Selecting Representative Traffic Another Way

In the embodiment where system 200 pre-computes all possible paths within the AS, representative traffic identifier 264 identifies the ninety-fifth percentile traffic for each Flow by performing the steps that will now be described.

1. Identify the Path of Each Packet

To identify the representative sample of traffic, representative traffic identifier 264 first identifies which path each packet takes through the AS. To identify the path, representative traffic identifier 264 uses the source and destination IP address in each packet stored in actual traffic storage 262 to assign the packet to a path in path storage 226 by associating an identifier of the path with the entry for the packet in actual traffic storage 262.

2. Group Packets by Receipt Interval

After assigning the least cost path to each entry in actual traffic storage 262, representative traffic identifier 264 groups the entries in actual traffic storage 262 by receipt interval in a manner similar to the way that representative traffic identifier 264 groups the entries in group storage 272 in the embodiment described above.

3. Sum Packets Using the Same Path During the Same Interval

Representative traffic identifier 264 sorts the packets in actual traffic storage 262 by group, and within each group, by looked-up path or Flow, and builds and stores in group storage 272 entries corresponding to the identifier of the ingress router, the path identifier and traffic byte count corresponding to the entries in actual traffic storage 262. The entries in group storage 272 are identical to those in actual traffic storage 262, except that representative traffic identifier 264 combines in group storage 262 entries in actual traffic storage 262 that are in the same group and were assigned the same looked-up path as described above. To combine two or more entries, representative traffic identifier 264 sums the number of bytes field for packets within a group that share a path, and stores the summed traffic byte count in the entry in group storage 272. Thus, only one entry exists in group storage 272 representing all of the traffic in actual traffic storage 262 that is in the same group and has the same path.

4. Sort by Path and Byte Count

Representative traffic identifier 264 then sorts the entries in group storage 272 by path, and sorts entries with common paths by the traffic byte count in descending order, which may have been summed as described above.

5. Select a Representative Entry for Each Path

Representative traffic identifier 264 identifies a representative entry in group storage 272, such as the packet having a traffic byte count in the ninety-fifth percentile of all traffic byte counts for that particular path, in a similar manner to the way that representative traffic identifier 264 identified a representative group entry in the embodiment described above.

When representative traffic identifier 254 has selected a representative entry for each path as described above, representative traffic identifier 254 signals simulator 240.

Simulate Traffic

Simulator 240 receives the signal and removes any entries from simulation storage 242, then builds in simulation storage 242 a list of all the links in every path in representative traffic storage 250 and cumulates the effect of the representative traffic from each path in representative traffic storage 250 on the links that make up each path. To accomplish this cumulation, simulator 240 selects the first entry from representative traffic storage 250, extracts the ingress router IP address and the egress router IP address from the selected entry, and sends the ingress router IP address and the egress router IP address to path manager 224. Path manager 224 receives the IP addresses of the two routers, computes or identifies (e.g. using routing tables) a path between the two routers as described above, and sends the computed path to simulator 240.

In one embodiment, the computed or identified path consists of a list of identifiers of entries within graph storage 222 representing a series of direct links between nodes, beginning with the ingress router and ending with the egress router.

Simulator 240 receives the computed or identified path and selects the first node of the computed path, referred to herein as the "origination node". Simulator 240 selects the "next" node in the path, and scans simulation storage 242 looking for a link entry (consisting of identifiers of the origination node and the next node) that was already entered in simulation storage 242 due to another path. If the link entry is not found, simulator 240 adds a link entry to simulation storage 242 containing the link (which may contain a pair of identifiers, such as IP addresses, consisting of the identifier of the origination node interface and the identifier of the next node interface) and a byte count, which is the traffic byte count from the selected representative traffic storage 250 entry. If the link entry is found, simulator 240 adds the traffic byte count of the selected entry in representative traffic storage 250 to the traffic byte count of the found link entry in simulation storage 242.

If there are additional nodes in the computed or identified path, simulator 240 designates the next node as the new origination node and selects the next node in the computed path as the new next node. Simulator 240 then repeats the above procedure for the link. Simulator 240 continues processing the nodes in the computed or identified path as described above until there are no additional nodes in the computed or identified path, at which point simulator 240 selects another unselected entry in representative traffic storage 250 and repeats the above procedure for the selected entry in representative traffic storage 250 until the traffic from all entries in representative traffic storage have been incorporated as link traffic in simulation storage 242 as described above, at which point simulator 240 signals load factor calculator 244.

In the embodiment where system 200 pre-computes all possible paths within the AS, once simulator 240 has selected the first entry from representative traffic storage 250, simulator uses the path identifier stored in the selected entry in representative traffic storage 250 to locate and select the corresponding entry in path storage 226, selects the first node in the path as the "origination node", selects the "next" node in the path, and continues in a similar manner to the previously described embodiment, using the path identifier stored within each representative traffic storage 250 entry to locate the corresponding path storage 226 entry, and adding and updating link entries to simulation storage 242 until the traffic from all entries in representative traffic storage have been incorporated as link traffic in simulation storage 242 as described above, at which point simulator 240 signals load factor calculator 244.

Calculate Utilization

When signaled by simulator 240, simulation storage 242 contains one entry for each link in the AS over which representative traffic flows, with each entry containing a total traffic byte count for that link when the representative traffic for all Flows passes through the network at the same time, even though such representative traffic may have been received at different times and even at different offsets. Load factor calculator 244 calculates a load factor for each such link by using the traffic byte count in simulation storage 242 and the link bandwidth in graph storage 222, as will now be described.

For each link entry in simulation storage 242, load factor calculator 244 scans graph storage 222 to locate the entry referencing the same link in the same direction. Load factor calculator 244 divides the traffic byte count from the entry in simulation storage 242 by the time interval used to assign traffic to groups as described above to get bytes per second, and divides the result by the entry it located in capacity storage 218 to arrive at a utilization, and then divides the utilization by one minus the utilization to arrive at the load factor for the link. Load factor calculator 244 stores the load factor for each link in the entry for that link in simulation storage 242. In other embodiments, the load factor is calculated using other functions that produce a load factor that approaches infinity or another large number as the utilization approaches one.

Load factor calculator 244 adds together the load factors for each link in simulation storage 242 to arrive at a load factor for the entire AS, which load factor calculator 244 provides to link cost adjustor 230.

Preserve the Original State and Load Factor of the System.

Link cost adjustor 230 checks a "first pass" flag in simulation storage 242, which system 200 has initialized upon startup to true. If link cost adjustor 230 determines that the first pass flag is true, then link cost adjustor stores the load factor as the "prior load factor" and stores the load factor as the "original load factor", both in simulation storage 242, to preserve the load factor of the AS according to the cost metrics received from the AS as described above.

If the first pass flag is true, link cost adjustor 230 also makes a copy of each entry in simulation storage 242, marks the copies as "original link records", and stores the copy in a special area of simulation storage 242 to allow a comparison between the AS as it is configured, and a recommended configuration that is determined as described below. The original link records in the special area of simulation storage are not altered during the remainder of the processes described below: they are used to preserve the state of the AS as it is, so that the state may be compared by report generator 270 as described below. If the first pass flag is true, link cost adjustor 242 sets the first pass flag to false, and signals link group selector 232. Otherwise, link cost adjustor 230 operates as described below.

Select Group

Link group selector 232 unmarks any previously marked links and then randomly selects and marks as being in a current group a starting percentage, such as twenty-five percent, of the links in graph storage 222, subject to a limitation described below that no links are marked as being in the current group if they have been adjusted twice as described below. Link group selector 232 then signals link cost adjustor 230.

Adjust Link Costs and Simulate Again

Link cost adjustor 230 performs a series of trial simulations by adjusting the cost of one link in the current group at a time. To perform the trial simulation, link cost adjustor 230 selects one link in the current group, marks the link as selected, scans graph storage 222 to locate the entry for the link, and copies the link cost from the located entry in graph storage 222 into the entry for the selected link as the old cost for the link in order to preserve it, so that after the trial simulation, it may be returned to its original value. Link cost adjustor 230 computes an increased cost by multiplying the old cost by an increase factor, such as 1.30, and stores the increased cost in the located entry in graph storage 222, replacing the link cost. Although an increase factor of 1.30 is used in one embodiment, in another embodiment link cost adjustor 230 uses another value for the increase factor, such as 1.25, although other embodiments use other increase factors, and an increase factor of less than 1.0 may be used to reduce the costs in other embodiments.

Link cost adjustor 230 signals path manager 224 to repeat the process starting with computation of the shortest paths described above. Link cost adjustor 230 receives the load factor from load factor calculator 244 and stores the load factor in the entry with the identifier of the adjusted link in simulation storage 242.

Link cost adjustor 230 then resets the adjusted link's cost back to the old cost by replacing the cost in the located entry in graph storage 222 with the old cost from the link entry in simulation storage 242. Although link costs are used in the embodiment described herein, other characteristics may be adjusted in addition to, or in place of, the link cost in other embodiments of the present invention. Link cost adjuster 230 selects a previously unselected link from the current group, increases its cost as described above, and repeats the above procedure until every link in the current group has been selected, its cost increased, the load factor calculated and its cost returned to its value prior to the most recent selection of that link.

After link cost adjustor 230 has calculated the load factor for each case where the cost of one of the links in the current group has been increased as described above, link cost adjustor 230 scans the entries in simulation storage 242 containing the identifiers of the adjusted links and stored load factors, and locates and selects the entry with the lowest load factor. If there is more than one entry with the lowest load factor, the first such entry located is selected, although other embodiments may use other selection techniques. Link cost adjustor 230 compares the selected load factor to the prior load factor, and if the selected load factor is lower than the prior load factor, link cost adjustor 230 stores the selected load factor as the prior load factor, selects the link from the selected entry, scans graph storage 222 for an entry containing the selected link, and chooses it.

Link cost adjustor 230 increases the cost of the link in the chosen entry in graph storage 242 by multiplying by an increase factor as described above, but need not save the old cost because the link cost of the chosen entry will not be reduced as it was with the trial simulations described above. Thus, the link cost for the chosen link is said to have been "ratcheted": its cost will not be returned to its prior value for subsequent simulations, although, it may be increased again. Link cost adjustor 230 also increments an adjustment counter in the chosen entry that indicates the number of times the link cost has been ratcheted in graph storage 222.

Select with Another Group and Repeat

Link cost adjustor 230 signals link group selector 232 to select another group at random as described above, but link group selector 232 does not designate a link as a member of the group if the link has been marked as having been adjusted twice.

Once link group selector 232 has selected another group, it signals link cost adjustor 230 which performs a series of trial adjustments to the cost of one link and recomputes the load factor each time as described above.

If link cost adjustor 230 finds that the selected load factor is not lower than the prior load factor, link cost adjustor 230 signals link group selector 232 to increase the percentage of all the links it places in the current group by adding a group size adjustment, and repeats the above process. In one embodiment, link group selector 232 uses a group size adjustment percentage of five percent, increasing the percentage it uses to select the group by five percent (e.g. from 25 to 30 percent), although other embodiments use other group size adjustment percentages.

If link group selector 232 happens to designate as being in the group all of the entries not marked as having been adjusted twice for link group selector 232's group, link group selector 232 signals this fact to link cost adjustor 230. In one embodiment, link group selector 232 performs one more iteration with the designated entries before signaling link cost adjustor 230.

When link cost adjustor 230 receives such a signal, link cost adjustor 230 signals simulator 240 to repeat the simulation of the system using the ratcheted link costs, including the most recent ratchet (the AS with such link costs is referred to as the "final ratcheted configuration"). Simulator 240 performs this simulation, providing the effect of the representative traffic in simulation storage 242 and signaling load factor calculator 244 as described above, which provides the load factor to link cost adjustor 230. Link cost adjustor 230 then provides the load factor to report generator 270.

If link group selector 232 is unable to select the correct percentage of links because the number of links not marked as having been selected twice is insufficient to allow selection of a group as described above, link group selector 232 signals simulator 240 to simulate the AS using the ratcheted link costs, including the most recent ratchet (the AS with the final ratcheted link costs is referred to as the final ratcheted configuration). When simulator has completed simulating the AS and storing the result in simulation storage 242, simulator 240 signals load factor calculator 244, which provides the load factor to link group selector 232 as described above, which then provides the utilization to report generator 270.

Reporting

When report generator 270 receives the load factor as described above, simulation storage 242 contains the original load factor that may be used to compare with the load factor received. Graph storage 222 contains the cost metrics for each link that may provide a load factor that is lower than the original load factor, and IGP/(I)BGP storage 214 contains the original cost metrics of the links that can be used for comparison purposes as described below. Simulation storage 242 contains the traffic on each link for the configuration utilizing the ratcheted link costs as well as the traffic on each link according to the original configuration in the special area.

Report generator 270 uses this information to generate a report comparing the load factors, cost of each link, and traffic on each link in both the original and the final ratcheted configurations.

In one embodiment, report generator 270 sorts by the load factor of each link in the original configuration the link identifiers before reporting, showing, for each link, the original cost and load factor and the optimized cost and load factor on each line of the report. In one embodiment, report generator 270 sorts the load factors from highest to lowest before reporting, showing the link identifier and load factor both before and after optimization. Report generator 270 sends the report to a conventional display, printer, or other conventional output device (not shown) via communications interface 210.

In one embodiment, the user can cause system 200 to install a final ratcheted configuration onto the AS. To do so, the user signals user interface manager 204, which signals configuration installer 280.

When it receives such signal, configuration installer 280 scans graph storage 222 and, for each link, extracts the link cost and compares the extracted link cost to the cost for the link in IGP/(I)BGP storage, and if the two are different, provides the extracted link cost to the source router of the link to use as its new cost for that link using conventional commands, for example, using Telnet to log into a router and changing the cost metric using conventional router administration commands.

In another embodiment, instead of adjusting link costs on each router, configuration installer 280 provides the adjusted link costs to a multiprotocol label switching label edge router. The label edge router can then use these costs to establish new label-switched paths using a conventional routing algorithm and can label packets using the results. Alternatively, configuration installer 280 may signal path manager 224 to compute and store the least cost paths as described above and path manager 224 provides such path information to each such label edge router to explicitly establish label-switched paths. A description of MPLS can be found in RFC 3031 and the website of MPLSRC.com.

In one embodiment, storage elements 214, 218, 222, 226, 250, 242, 262, and 272 are conventional storage such as conventional memory or disk storage.

Figure 3:
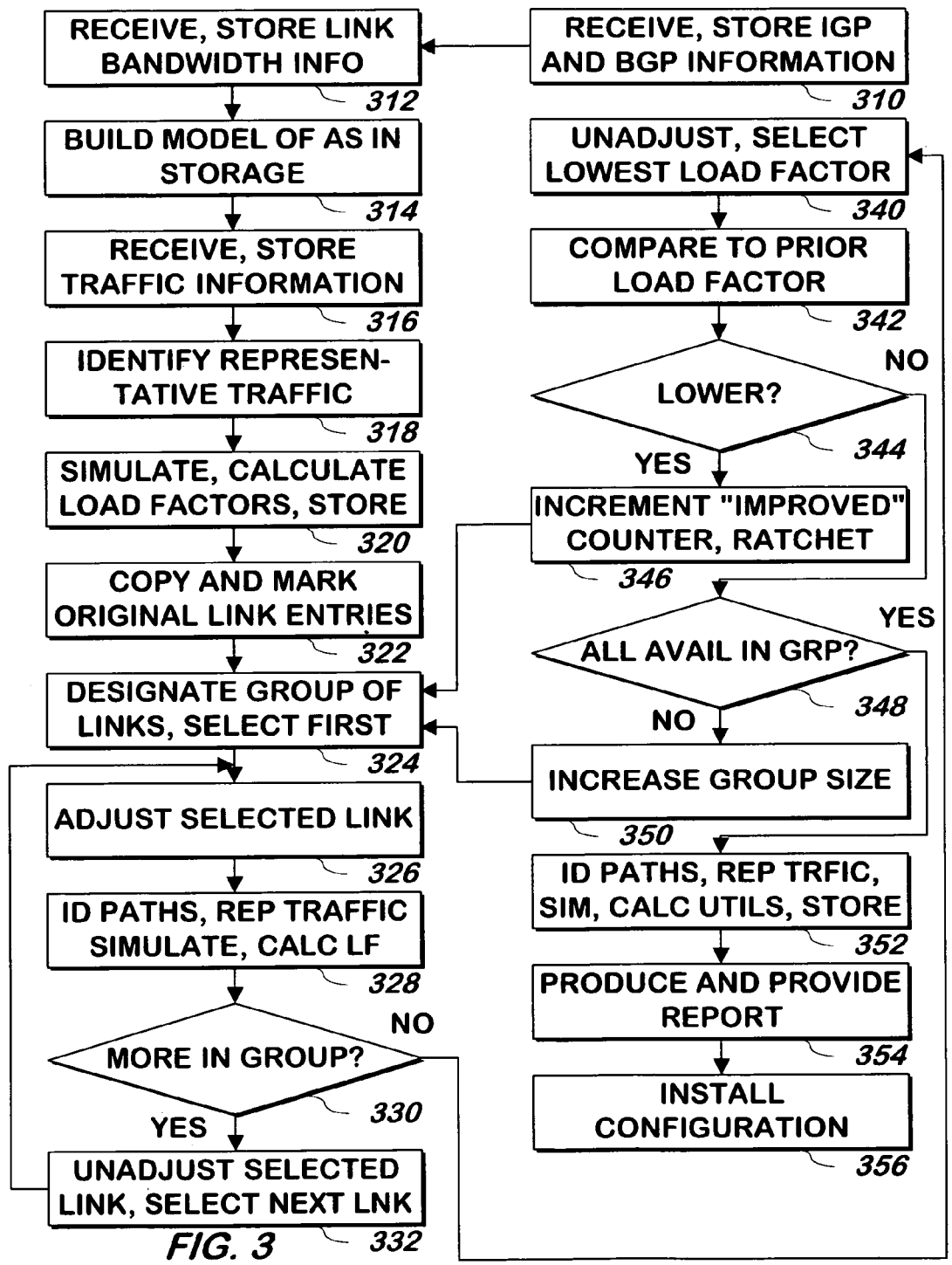
FIG. 3 is a flowchart illustrating a method of identifying optimum link costs to more evenly distribute traffic through a network according to one embodiment of the present invention.

Referring now to FIG. 3, a method for identifying optimum link costs to balance an AS or other network is shown according to one embodiment of the present invention. IGP and (I)BGP information is received 310 and stored, and bandwidth capacity information is received 312 and stored as described above. A graph modeling the AS is built 314, and traffic information is received 316, each as described above. Representative traffic through the AS is identified 318 as described above.

Figure 4:
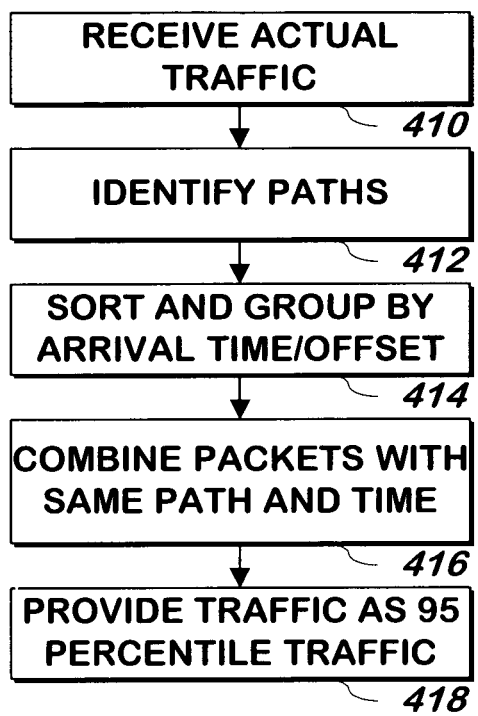
FIG. 4 is a flowchart illustrating a method for identifying representative traffic for paths according to one embodiment of the present invention.

Referring momentarily to FIG. 4, a method for identifying representative traffic such as is performed in step 318 of FIG. 3, is shown according to one embodiment of the present invention. The actual traffic data is received 410 and the paths identified 412 as described above. The traffic data is sorted and grouped 414 by arrival time interval or arrival time offset interval as described above. Packets with the same Flow and arrival time interval or arrival time offset interval are combined 416, and the 95th percentile of traffic data is provided 418 as the representative traffic for the Flow as described above.

Referring again to FIG. 3, traffic is simulated 320 and the AS load factor (LF) is calculated and stored as the "prior load factor" and as the "original load factor" as described above. The link entries are copied 322 and marked as originals as described above. A group of links is designated 324 from those links not already adjusted twice as described above, and the first link of the current group is selected. The selected link is adjusted 326, and traffic flow is again estimated 328, simulated, and load factor calculated and stored associated with the link as described above.

If there are more links in the current group 330, then the adjusted link is unadjusted 332, the next link is selected as described above, and the method continues with step 326.

If there are no more links in the current group 330, then the selected link is unadjusted 340 and the link having the lowest load factor from the group is selected as described above. This result is compared 342 to the prior load factor. If lower 344, the "improved" counter within the link entry is incremented 346, the selected link is adjusted as described above, and the method continues with step 324.

If the load factor is not lower than the last 344, then a check is made 348 to see if all available links were selected. If not all available links were selected 348, then the group size is increased 350 as described above and the method continues with step 324. If all available links have been selected 348, then the path with the lowest load factor is recalculated 352, and a report is produced and provided 354 as described above. The configuration may be installed 356 onto the AS, for example, by installing changed link costs onto routers that advertise them or by providing the link costs to a multiprotocol label switching label edge router as described above.

Figure 5:
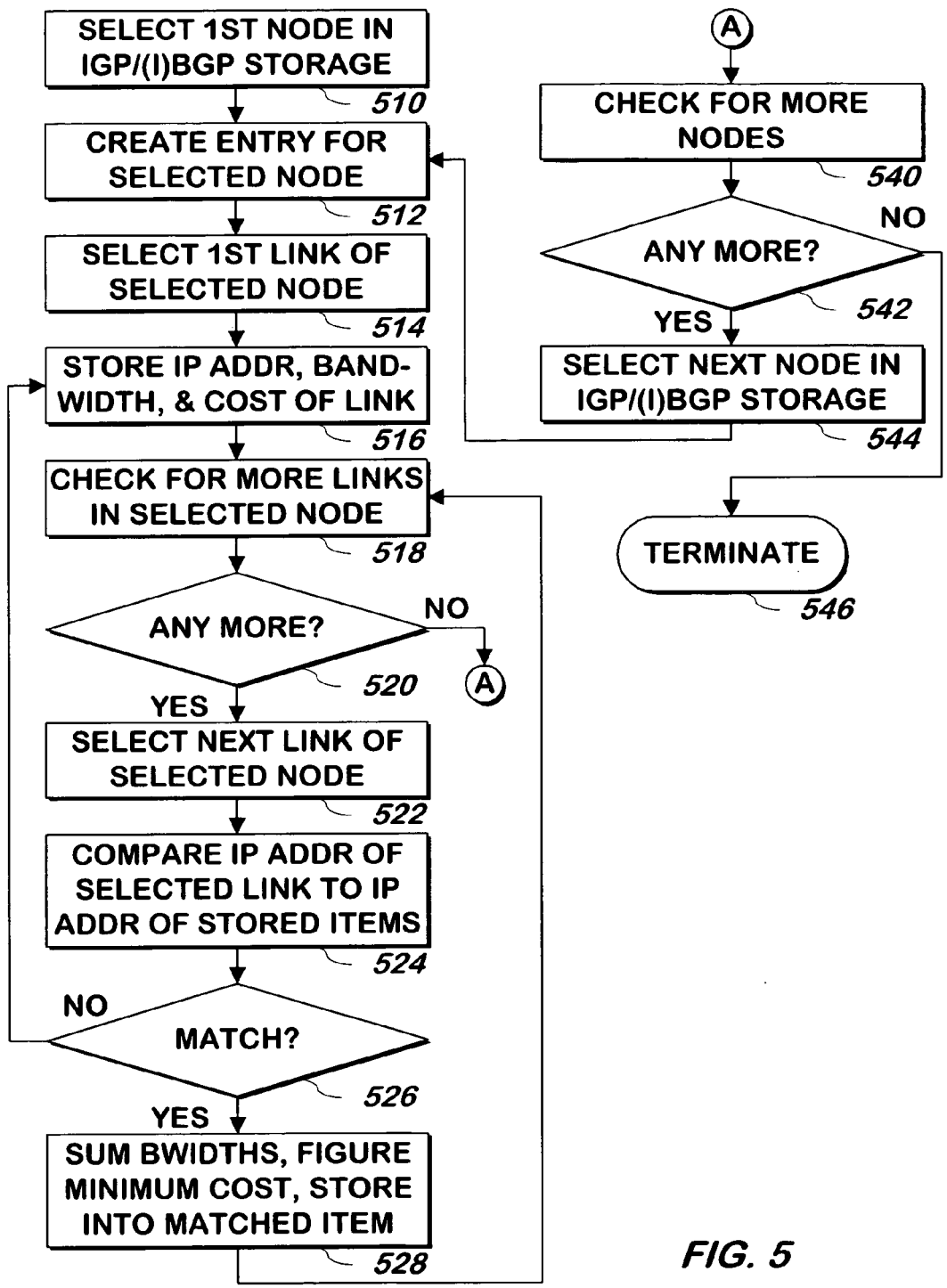
FIG. 5 is a flowchart illustrating a method of building a model of an AS in storage according to one embodiment of the present invention.

Referring now to FIG. 5, a method for building a model of the AS in storage such as is performed in step 314 of FIG. 3, is shown according to one embodiment of the present invention. The first node in IGP/(I)BGP storage is selected 510, and an entry is created 512 for the selected node in storage as described above. The first direct link of the selected node is selected 514, and the IP address, bandwidth, and cost of the selected link is stored 516 as an item in a list of items within the node entry as described above.

A check is made 518 for more direct links associated with the selected node, as described above. If there are no more direct links 520 then the method continues with step 540; if there are more direct links 520 then the next direct link of the selected node is selected 522 as described above.

The IP address of the selected link is compared 524 to the IP addresses of each item in the list of items in the node entry, as described above. If no match is found with any item 526, then the method continues with step 516. If a match is found with any item 526, then the bandwidth of the selected link is added to the bandwidth from the matched item with the resulting sum stored 528 in the matched item, the minimum of the cost from the selected link and the cost of the matched item is stored in the matched item as described above, and the method continues with step 522.

Continuing now with step 540, a check is made 540 for more nodes in IGP/(I)BGP storage as described above. If none are found 542, then the method terminates 546 as described above. If more nodes are found 542, then the next node in IGP/(I)BGP storage is selected 544 as described above and the method continues with step 512.

What is claimed is:

1. A method of reporting traffic in a network, comprising:
receiving, over the network, routing information pertaining to at least one autonomous system in a computer network;
receiving a plurality of sets of traffic information reporting at least some of all traffic received by at least one device in the network, each set of traffic information comprising a source address and a destination address for at least one communication;
using the routing information received to identify at least one path comprising a plurality of links in the autonomous system that would be taken by at least one of said at least one communication corresponding to each of the plurality of sets of traffic information; and
assigning to each of the plurality of links in the at least one path an amount of traffic responsive to the traffic information corresponding to said at least one path; and
providing a traffic report indicating an amount of traffic on each of at least some of the plurality of links responsive to the amounts of traffic assigned to said links.

2. The method of claim 1:
additionally comprising receiving bandwidth information for each of the plurality of links; and
wherein the traffic report is additionally responsive to the bandwidth information received.

3. The method of claim 2:
additionally comprising computing a sum of bandwidth information for each of at least one subset of the plurality of links, each subset of the plurality of links having a same pair of nodes; and
wherein the traffic report is additionally responsive to at least one said sum.

4. The method of claim 2:
additionally comprising identifying a lowest link cost among members of each of at least one subset of the plurality of links, each subset of the plurality of links having a same pair of nodes; and
wherein the traffic report is additionally responsive to at least one lowest link cost.

5. The method of claim 1:
additionally comprising associating the traffic information received with a plurality of time offsets, each time offset indicating a relative amount of time from one of a plurality of different times; and
wherein the traffic report is additionally responsive to the plurality of time offsets.

6. The method of claim 1, wherein the traffic report only includes traffic traveling between border routers of an autonomous system.

7. A system for reporting traffic in a network, comprising:
an IGP/(I)BGP receiver having an input for receiving, over the network, routing information pertaining to at least one autonomous system in a computer network, the IGP/(I)BGP receiver for providing the routing information at an output;
a traffic information receiver having an input for receiving traffic information about at least some traffic received by at least one device in the network, the traffic information comprising a source address and a destination address for a plurality of communications, the actual traffic receiver for providing the traffic information at an output;
a simulator having an input coupled to the actual traffic receiver output for receiving at least some of the traffic information, the simulator for providing at an output, information corresponding to the at least some of the traffic information;
a path identifier having an input coupled to the simulator output for receiving the information corresponding to the at least some of the traffic information, and having a second input coupled to the IGP/(I)BGP receiver output for receiving the routing information, the path identifier for providing at an output, for each of the at least some of the traffic information at least one path comprising a plurality of links in the autonomous system that would be taken by a communication corresponding to said traffic information;
the simulator input additionally coupled to the path identifier output for receiving the at least one path and the simulator additionally for assigning to each of the plurality of links in the at least one path an amount of traffic responsive to the traffic information corresponding to said path and for providing said assigned traffic information at the simulator output; and a report generator having an input coupled to the simulator output for receiving the assigned traffic information, the report generator for generating and providing at an output a traffic report indicating an amount of traffic on each of at least some of the plurality of links responsive to the amounts of traffic assigned to said links.

8. The system of claim 7:

additionally comprising a capacity retriever for retrieving via an input/output bandwidth information for each of at least some of the plurality of links, the capacity retriever for providing the bandwidth information at an output; and wherein the report generator input is additionally coupled to the capacity retriever output for receiving the bandwidth information, and the report generator generates the traffic report additionally responsive to at least some of the bandwidth information received at the report generator input.

9. A computer program product comprising a computer useable non-transitory medium having computer readable program code embodied therein for reporting traffic in a network, the computer program product comprising computer readable program code devices configured to cause a computer system to:

receive, over the network, routing information pertaining to at least one autonomous system in a computer network;

receive a plurality of sets of traffic information reporting at least some of all traffic received by at least one device in the network, each set of traffic information comprising a source address and a destination address for at least one communication;

use the routing information received to identify at least one path comprising a plurality of links in the autonomous system that would be taken by at least one of said at least one communication corresponding to each of the plurality of sets of traffic information; and assign to each of the plurality of links in the at least one path an amount of traffic responsive to the traffic information corresponding to said at least one path; and provide a traffic report indicating an amount of traffic on each of at least some of the plurality of links responsive to the amounts of traffic assigned to said links.

10. The computer program product of claim 9:

additionally comprising computer readable program code devices configured to cause the computer system to receive bandwidth information for each of the plurality of links; and wherein the traffic report is additionally responsive to the bandwidth information received.

11. The computer program product of claim 10:

additionally comprising computer readable program code devices configured to cause the computer system to compute a sum of bandwidth information for each of at least one subset of the plurality of links, each subset of the plurality of links having a same pair of nodes; and wherein the traffic report is additionally responsive to at least one said sum.

12. The computer program product of claim 10:

additionally comprising computer readable program code devices configured to cause the computer system to identify a lowest link cost among members of each of at least one subset of the plurality of links, each subset of the plurality of links having a same pair of nodes; and wherein the traffic report is additionally responsive to at least one lowest link cost.

13. The computer program product of claim 9:

additionally comprising computer readable program code devices configured to cause the computer system to associate the traffic information received with a plurality of time offsets, each time offset indicating a relative amount of time from one of a plurality of different times; and wherein the traffic report is additionally responsive to the plurality of time offsets.

14. The computer program product of claim 9, wherein the traffic report only includes traffic traveling between border routers of an autonomous system.

* * * * *